June 13, 1939.  H. M. DREHER  2,162,611
BOLTING OR CLAMPING DEVICE
Filed June 13, 1938
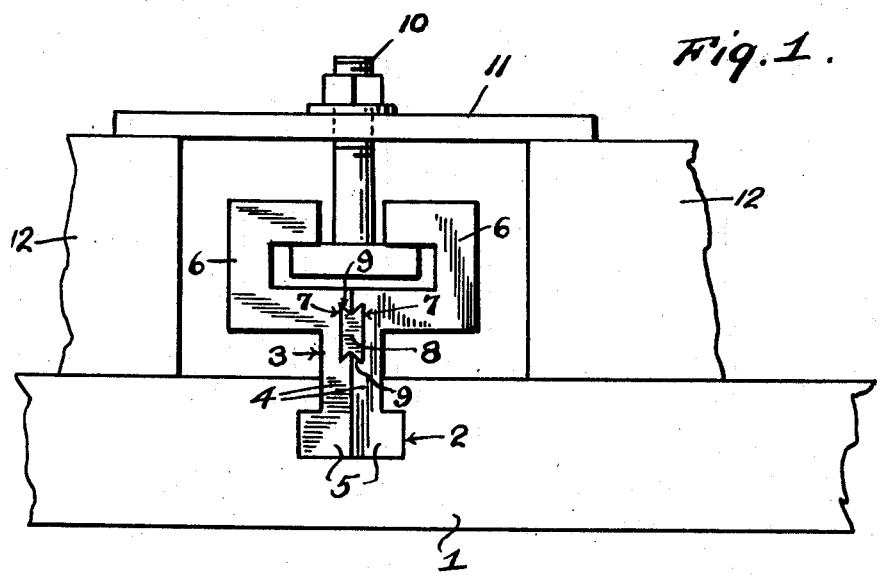
Fig. 1.
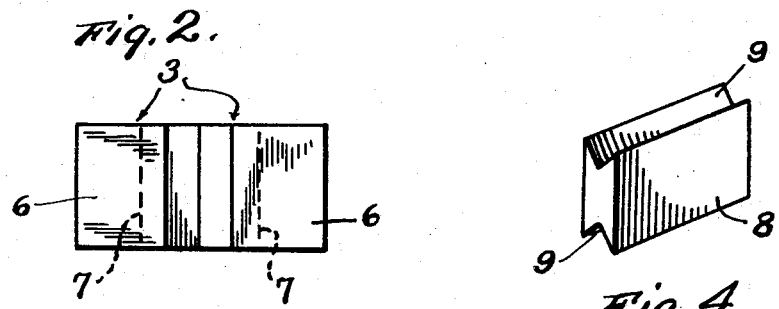
Fig. 2.
Fig. 4.
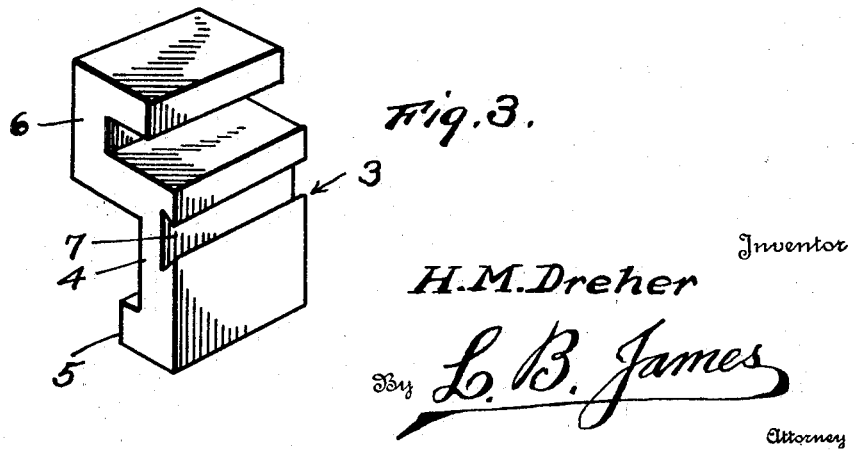
Fig. 3.
Inventor
H. M. Dreher
By L. B. James
Attorney Patented June 13, 1939

2,162,611

UNITED STATES PATENT OFFICE 2,162,611

BOLTING OR CLAMPING DEVICE

Harley M. Dreher, Medina, Ohio

Application June 13, 1938, Serial No. 213,542

1 Claim. (Cl. 144—290)

This invention relates to a bolt clamp, the general object of the invention being to provide a pair of clamping jaws for holding a bolt in place for forming part of a clamp, with means for holding the jaws in a slot or groove in the top of a bench or table.

The invention also consists in certain other features of construction, combination and arrangement of the several parts, to be hereinafter fully described, illustrated in the accompanying drawing and specifically pointed out in the appended claim.

In describing the invention in detail reference will be had to the accompanying drawing wherein like characters denote like or corresponding parts throughout the several views, and in which:

Fig. 1 is an elevation showing the jaws in position as holding a bolt which is used as a part of a clamp for holding parts to the table.

Fig. 2 is a top plan view of the two jaws.

Fig. 3 is a perspective view of one of the jaws.

Fig. 4 is a view of the member for holding the two jaws together.

In this drawing, the numeral 1 indicates the top of a table or bench, said top being formed with a T shaped groove 2 therein, which opens out through the top face of the top and an end of the groove opens out through an edge of the top, as shown. This groove is to receive the lower ends of the jaws 3, each of which is formed with a lower straight part 4 having a flange 5 at its lower end, these flanges extending outwardly and said ends 4 with the flanges 5 engage the groove 2 as shown in Fig. 1 to hold the jaws in upright position on the table top and with the parts 4 contacting each other. A channel part 6 forms a part of each jaw and the lower flange of the channel is connected with the upper end of the part 4 and extends outwardly therefrom. The upper flange of the channel is shorter than the lower one, so that the two upper flanges are spaced apart when the parts 4 are in contacting relation. A dove tail groove 7 extends laterally across the inner face of the upper part of portion 4 and these grooves receive a locking block 8 which has a V-shaped groove 9 in each side edge thereof, as shown in Fig. 4. As will be seen from Fig. 1 this block, when placed in the grooves 7 will interlock the two jaws together. The block, of course, is put in place by a sliding motion from either side of the jaws.

When the jaws are placed together in the groove of the table top their channel parts will form a holder for the head of the bolt 10 which is used to hold the clamping plate 11 in clamping position on a member, or members 12 placed on the table, as shown in Fig. 1. The head of the bolt can be easily removed from the jaws and another one inserted and these jaws will hold bolts of different sizes.

It is thought from the foregoing description that the advantages and novel features of the invention will be readily apparent.

It is to be understood that changes may be made in the construction, combination and arrangement of the several parts, provided such changes fall within the scope of the appended claim.

What I claim and desire to protect by Letters Patent is:

A table top clamp comprising a pair of jaws having outwardly extending flanges at their lower ends, and the table top having a T shaped groove therein for receiving said flanged ends, and a channel shaped part at the upper end of each jaw, the upper flanges of said channel parts being spaced apart for the passage of a bolt, the head of which is held by the channel parts, each jaw having a dove tail shape groove in its inner face and a block having V-shaped grooves in its edges, said block fitting in the grooves to lock the jaws together.

HARLEY M. DREHER.